W. B. HANLON.
SHIELD FOR CAR WINDOWS.
APPLICATION FILED APR. 11, 1910.
993,061. Patented May 23, 1911.
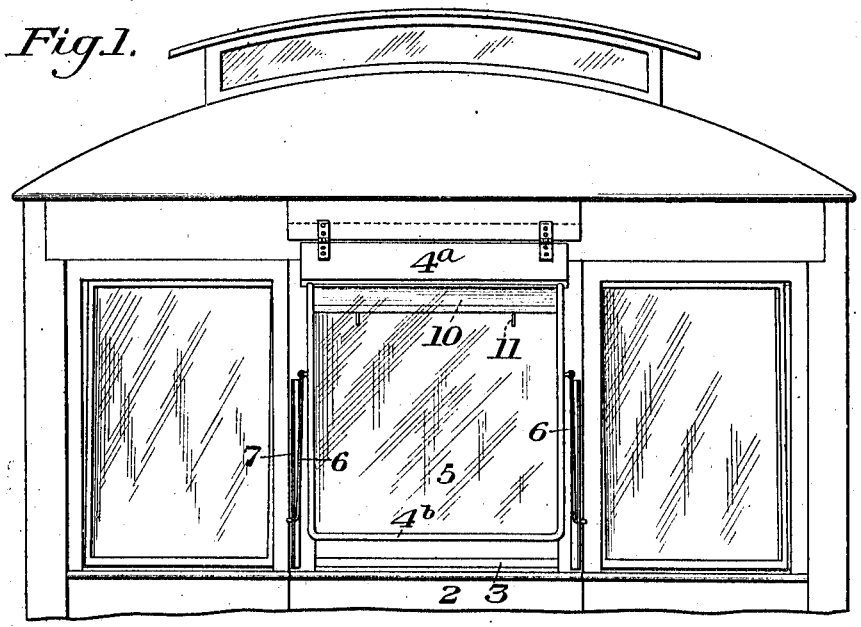
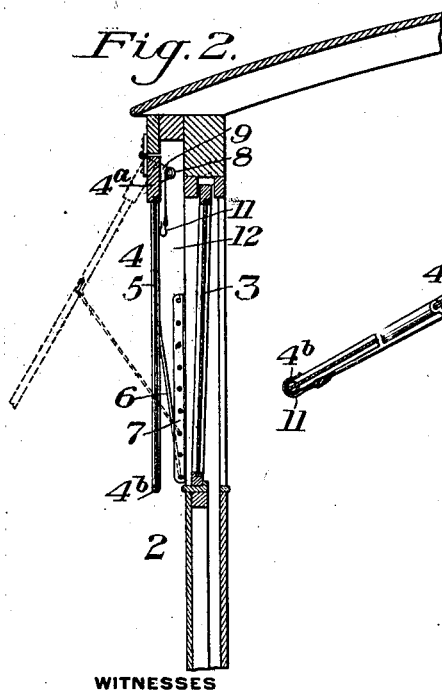
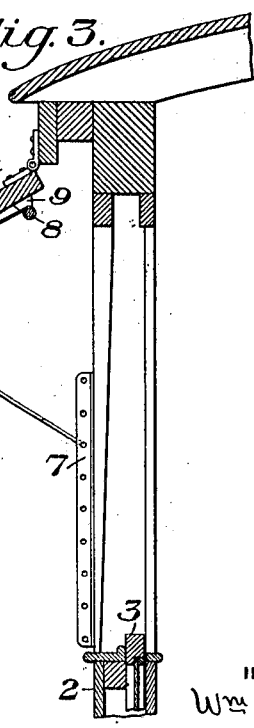
WITNESSES
R. A. Balderson
Walter Famariss
INVENTOR
Wm. B. Hanlon,
by Bakewell, Byrnes & Parmelee
his Attys

UNITED STATES PATENT OFFICE.

WILLIAM B. HANLON, OF PITTSBURG, PENNSYLVANIA.

SHIELD FOR CAR-WINDOWS.

993,061. Specification of Letters Patent. Patented May 23, 1911.

Application filed April 11, 1910. Serial No. 554,732. REISSUED

*To all whom it may concern:*

Be it known that I, WILLIAM B. HANLON, of Pittsburg, Allegheny county, Pennsylvania, have invented a new and useful Shield for Car-Windows, of which the following is a full, clear, and exact description, reference being had to the accompanying drawings, forming part of this specification, in which—

Figure 1 is a front end view of a car having my invention applied thereto; and Figs. 2 and 3 are vertical sections showing the shield in different adjusted positions.

My invention has relation to shields for car windows, and more particularly to shields for the front or motorman's window of electrically propelled cars.

The object of my invention is to provide simple and effective means for protecting such windows from becoming coated or covered with frost, or snow and sleet, and also may be used to form a protection against the sun, wind, dust, etc.

The nature of my invention will be best understood by reference to the accompanying drawings, in which I have shown the preferred embodiment thereof, which will now be described, it being premised, however, that various changes may be made in the details of construction and arrangement of the parts without departing from the spirit and scope of my invention as defined in the appended claims.

In the drawings, the numeral 2 designates the front end of an electrically propelled car, and 3 is the usual front or motorman's window.

4 designates a frame, which is hinged or pivoted to the front end of the car above and in front of the window 3. This frame may be of any suitable character for supporting a pane of glass or other transparent material 5, which is preferably of substantially the same area as the glass of the window 3. The frame 4 is designed to be supported in any one of a number of different positions by means of the hooked brace rods 6 attached to the sides of the frame 4 and the hooks of the free ends of which are arranged to be engaged at different points with perforations in the strips 7.

8 designates a shade roller, which is supported in suitable brackets 9 secured to the inner side of the upper member $4^a$ of the frame 4, and to which is attached a shade 10 having hooks 11 at its free edge, which, when the shade is drawn out, can be engaged with the lower bar $4^b$ of the frame 4.

When the frame 4 is in its normal vertical position, it is separated from the window 3 by an intervening air space or chamber 12, which will prevent the formation of frost on the window 3. In stormy weather the frame 3 will be adjusted to the inclined position indicated in Fig. 3, being elevated sufficiently to permit the motorman to see below its lower edge, and in which position it effectively acts as a guard to prevent sleet or snow beating against the window 3. In warm weather, the frame 4 may also be adjusted to this position, and the shade 10 pulled down as shown in Fig. 3 for the purpose of protecting the motorman from the sun. If the window 3 is open, the shield will also act as a guard to protect the motorman against wind, dust, etc.

It will be obvious that my invention can be readily applied to cars at a comparatively small cost. It will also be obvious that the exact manner of connecting it with the car, and other details thereof, may be changed without departing from my invention.

What I claim is:—

1. The combination with a motor driven car having an observation window at its forward end, of a frame hinged at its upper edge to the car above and in front of said window and having a transparent pane or panel, together with means for securing said frame in different angular positions, and at such an angle that the motorman can see below its lower edge, said frame and its pane, when in vertical position being separated from the observation window by a dead air space tending to prevent the formation of frost on the said window, and when in raised position forming a storm shield to prevent the weather from beating against the window, substantially as described.

2. The combination with a motor driven car having an observation window at its forward end, of a frame hinged at its upper edge to the car above and in front of said window and having a transparent pane or panel, together with means for securing said frame in different angular positions, and at such an angle that the motorman can see below its lower edge, said frame and its pane when in vertical position being separated from the observation window by a dead air space tending to prevent the formation of frost on said window, and when in raised position forming a storm shield to prevent the weather from beating against the window, the adjusting and securing means for the frame being wholly exterior of the said window, substantially as described.

3. A shield for the motorman's window of cars, comprising a frame hinged or pivoted to the front end of the car above and in front of the motorman's window, and having a transparent pane or panel, there being an air space or chamber between the said pane or panel and said window, and means for holding the said frame in vertical position, and also in an angular position, with a shade secured to the inner side of said frame and adapted to be drawn across the transparent pane or panel; substantially as described.

In testimony whereof, I have hereunto set my hand.

WM. B. HANLON.

Witnesses:
GEO. B. BLEMIN'
H. M. CORWIN.

Copies of this patent may be obtained for five cents each, by addressing the "Commissioner of Patents, Washington, D. C."